United States Patent
Bregman et al.

(10) Patent No.: US 10,949,232 B2
(45) Date of Patent: Mar. 16, 2021

(54) MANAGING VIRTUALIZED COMPUTING RESOURCES IN A CLOUD COMPUTING ENVIRONMENT

(71) Applicant: Red Hat Israel, Ltd., Raanana (IL)

(72) Inventors: Arie Bregman, Gan Yavne (IL); Nir Magnezi, Petah Tikva (IL)

(73) Assignee: RED HAT ISRAEL, LTD., Raanana (IL)

( * ) Notice: Subject to any disclaimer, the term of this patent is extended or adjusted under 35 U.S.C. 154(b) by 119 days.

(21) Appl. No.: 16/136,375

(22) Filed: Sep. 20, 2018

(65) Prior Publication Data

US 2020/0097308 A1    Mar. 26, 2020

(51) Int. Cl.
*G06F 9/54* (2006.01)
*G06F 9/455* (2018.01)
*G06F 9/50* (2006.01)

(52) U.S. Cl.
CPC ........ *G06F 9/45533* (2013.01); *G06F 9/5011* (2013.01); *G06F 9/542* (2013.01)

(58) Field of Classification Search
CPC ....... G06F 9/45533; G06F 9/542; G06F 9/546
USPC ...................................... 719/313, 318; 718/1
See application file for complete search history.

(56) References Cited

U.S. PATENT DOCUMENTS

| 9,389,980 | B2 | 7/2016 | Ferris et al. |
| 9,495,142 | B2* | 11/2016 | Koushik ................... G06F 8/61 |
| 9,712,454 | B2 | 7/2017 | Tung et al. |
| 9,990,238 | B2 | 6/2018 | Seago et al. |
| 2018/0114126 | A1 | 4/2018 | Das et al. |
| 2019/0102257 | A1* | 4/2019 | Zhou ................... G06F 11/1461 |

OTHER PUBLICATIONS

Kress, J., et al., "Event-Driven SOA," Oracle, Dec. 2013, https://www.oracle.com/technetwork/articles/soa/ind-soa-events-2080401.html.
Phadake, "Get to the Root of Cloud Infrastructure Issues with Logs, Alerts and Events in Rovius 1.3.1," Accelerite Blog, Apr. 20, 2018, https://accelerite.com/blogs/cloud-infrastructure-logs-analysis-and-alerts/.
"AWS Cloud Trail," Amazon Web Services, Inc., 2018, https://aws.amazon.com/cloudtrail/.

* cited by examiner

*Primary Examiner* — Andy Ho
(74) *Attorney, Agent, or Firm* — Kilpatrick Townsend & Stockton LLP (57) ABSTRACT

Virtualized computing resources can be managed in a cloud computing environment. For example, a system can receive input indicating that a cloud computing environment is to be reverted back to a prior state prior to an event occurring. Based on the input, the system can determine actions that were performed in the cloud computing environment in response to the event. Each action can involve a creation, a modification, or a deletion of a virtualized computing resource in the cloud computing environment. The system can determine a particular order in which the actions were performed by analyzing timestamps corresponding to the actions. The system can then revert the cloud computing environment back to the prior state by performing an inverse of each action in the plurality of actions in a reverse order to the particular order.

20 Claims, 6 Drawing Sheets

| Action ID | Event ID | Timestamp | Resource ID | Action Type |
|---|---|---|---|---|
| 1 | 1 | Sept. 1, 2018 at 10:01 AM EST | 23478623 | Create |
| 2 | 2 | Sept. 1, 2018 at 10:02 AM EST | 12362368 | Create |
| 3 | 2 | Sept. 1, 2018 at 10:02 AM EST | 62312322 | Create |
| 4 | 2 | Sept. 1, 2018 at 10:03 AM EST | 12312343 | Create |
| 5 | 2 | Sept. 1, 2018 at 10:04 AM EST | 23412311 | Create |
| 6 | 1 | Sept. 1, 2018 at 10:05 AM EST | 78612323 | Create |
| 7 | 1 | Sept. 1, 2018 at 10:06 AM EST | 23478623 | Create |
| 8 | 3 | Sept. 4, 2018 at 2:00 PM EST | 78612323 | Delete |
| 9 | 3 | Sept. 4, 2018 at 2:00 PM EST | 23478623 | Delete |

MANAGING VIRTUALIZED COMPUTING RESOURCES IN A CLOUD COMPUTING ENVIRONMENT

TECHNICAL FIELD

The present disclosure relates generally to managing computing resources. More specifically, but not by way of limitation, this disclosure relates to managing virtualized computing resources in a cloud computing environment.

BACKGROUND

Cloud computing environments are generally formed from a shared pool of physical computing resources (e.g., servers, storage, etc.) that are accessible to users via the Internet. The users can interact with the cloud computing environment to trigger the creation of virtualized computing resources on the underlying physical computing resources in order to perform various tasks. Examples of such virtualized computing resources can include virtual machines, virtual networks, virtual data stores, virtual ports, virtual load balancers, or any other virtualized hardware having functionality in the cloud computing environment. The users may also interact with the cloud computing environment to delete or otherwise modify existing virtualized computing resources, as desired.

DETAILED DESCRIPTION

Cloud computing environments often include intricate systems of virtualized computing resources that depend on one another. Because these virtualized computing resources depend on one another, an event involving the creation or modification (e.g., deletion) of one virtualized computing resource in the cloud computing environment will often trigger a series of actions involving the creation or modification of other virtualized computing resources in the cloud computing environment. And some or all of these actions can, in turn, trigger one or more other actions. And so on. Given these cascading effects, it can be challenging to pinpoint which event(s) lead to a problem (e.g., a security, maintenance, or compatibility issue) in the cloud computing environment, making such problems difficult or impossible to fix. It can also be challenging to revert the cloud computing environment back to a prior state before the event(s) occurred, for example, to fix the problem once it has been identified.

Some examples of the present disclosure can overcome one or more of the abovementioned problems via management software that identifies and logs relationships between events and actions performed in a cloud computing environment. More specifically, the management software can identify which actions in the cloud computing environment are related to an event in order to create a relationship tree that specifies the sequence of actions resulting from the event. The management software can iterate this process each time an event occurs and dynamically link subsequent events to previous events through common ancestors (e.g., actions or virtualized computing resources) in their respective relationship trees. This can result in a holistic mapping of the events and actions that lead to the current state of the cloud computing environment. The management software can then use some or all of this mapping to improve the functioning of the cloud computing environment. For example, the management software can use the mapping to (i) identify sources of problems or potential problems in the cloud computing environment, (ii) warn a user that performing an action on a virtualized computing resource may negatively affect another virtualized computing resource (e.g., to prevent the cloud computing environment from breaking), or (iii) revert the cloud computing environment back to a prior state before an event or action occurred.

As a particular example, a cloud computing environment can receive a request for a virtual machine to be instantiated in the cloud computing environment. This request can be an example of an event. In response to the request, the cloud computing environment can perform a series of actions that includes first instantiating the virtual machine, then generating a virtual port for the virtual machine, and then generating a virtual network connection to a network via the virtual port. As the cloud computing environment performs these actions and other actions related to various events, the cloud computing environment can produce metadata about each action. The metadata can include an identifier of an event that triggered the action and a timestamp associated with the action. Management software can analyze the identifier in each action's metadata to determine a subset of actions that are related to the request. The management software can then organize the subset of actions by timestamp to determine an order in which the subset of actions occurred in the cloud computing environment in response to the request. The management software can store some or all of this information in one or more data structures (e.g., databases, tables, etc.).

At a later point in time, a user may interact with the cloud computing environment to update a setting of the virtual machine to a particular value. The management software may detect that the user is attempting to update the setting, access the datastructure(s) to determine that the virtual port relies on the virtual machine, determine that particular value of the setting is incompatible with the virtual port due to how the port was instantiated, and warn the user about this incompatibility. Since this incompatibility could lead to a number of problems, the user may heed this warning and decide to instead take some alternative action in order to prevent these problems from occurring in the cloud computing environment. For example, the user can interact with the cloud computing environment to initiate a reversion process in which the management software reverts the cloud computing environment to a previous state before the virtual machine, virtual port, and virtual network connection were generated. Now having a relatively "clean slate" to work with, the user can re-trigger the creation of the virtual machine such that the setting has the particular value from the start. This may result in the virtual port being subsequently generated in a manner that conforms to the particular value of the setting, thereby avoiding the abovementioned problems.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
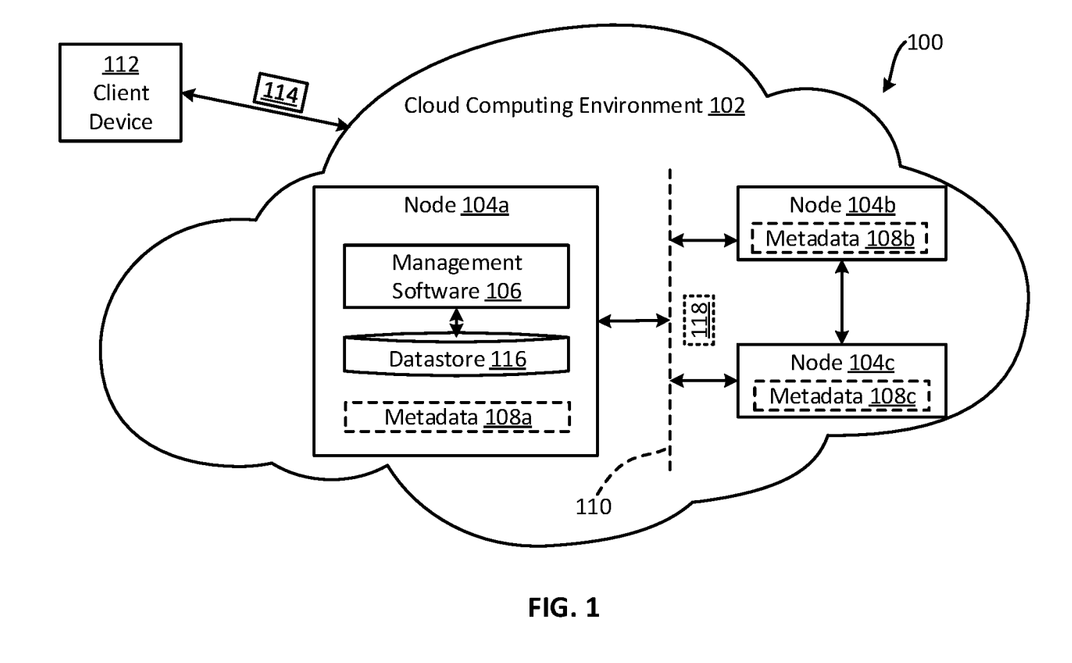
FIG. 1 is a block diagram of an example of a system for managing virtualized computing resources in a cloud computing environment according to some aspects.

FIG. 1 is a block diagram of an example of a system 100 for managing virtualized computing resources in a cloud computing environment 102 according to some aspects. The cloud computing environment 102 includes multiple nodes 104a-c (e.g., servers or other computing devices) in communication with one another. The nodes 104a-c can communicate with one another to collectively perform tasks in the cloud computing environment 102. For example, the nodes 104a-c can communicate with one another to perform distributed data processing or other distributed projects in the cloud computing environment 102.

The cloud computing environment 102 is also in communication with a client device 112, which can be any suitable device that is external to the cloud computing environment 102. Examples of the client device 112 can include a desktop computer, laptop computer, or mobile phone. A user can manipulate the client device 112 to interact with the cloud computing environment 102.

In some examples, one of the nodes 104a in the cloud computing environment 102 includes management software 106. The management software 106 can monitor events and actions in the cloud computing environment 102, determine which of the actions are related to which events, and store relationships between the actions and events in a datastore 116. Examples of the datastore 116 can include physical memory (e.g., a hard drive or random access memory) or virtual memory.

As a particular example, the client device 112 can transmit a request 114 to generate a virtual load balancer in the cloud computing environment 102. The management software 106 may monitor an application programming interface (API) through which the client device 112 submits such requests in order to detect the request 114. Alternatively, the management software 106 may serve as a proxy server that receives the request 114 from the client device 112, analyzes the request 114, and then forwards the request 114 to the cloud computing environment 102. Either way, the management software 106 can detect the request 114 from the client device 112 and flag the request 114 as an event.

Upon receiving the request 114, the cloud computing environment 102 can associate a unique identifier with the request 114. The unique identifier can distinguish the request event from other events that occurring in the cloud computing environment 102. The cloud computing environment 102 may then perform a series of actions in order to implement the virtual load balancer. For example, the cloud computing environment 102 can command the node 104b to run a pooling service that analyzes the existing virtual machines in the cloud computing environment 102 and assigns available virtual machines to a load-balancing pool. The load-balancing pool can be a group of virtual machines that network traffic is to be load balanced between. The cloud computing environment 102 can also command node 104c to start a listening service that listens a certain port for incoming network-traffic and distributes the incoming network-traffic among the load-balancing pool. The cloud computing environment 102 can also command the node 104a to start a health-monitoring service that monitors the health of the virtual machines in the load-balancing pool to determine if they can handle incoming network-traffic. The cloud computing environment 102 can further command the node 104b to start an inspection service that inspects incoming network-traffic (e.g., data packets) for certain types of headers. These services may collectively form the virtual load balancer.

As the nodes 104a-c perform each of the above actions, the nodes 104a-c can also generate metadata 108a-c related to each action. The metadata 108a-c can include the unique identifier associated with the request 114 and a timestamp associated with the action. In some examples, the nodes 104a-c can locally store the metadata 108a-c at locations (e.g., memory or filesystem locations) known to the management software 106. The management software 106 can periodically communicate with the nodes 104a-c to retrieve the metadata 108a-c from those locations as needed. In other examples, the nodes 104a-c can transmit the metadata 108a-c to the management software 106. For example, the nodes 104a-c may all be subscribed to the same messaging bus 110. The messaging bus 110 is a virtual communication channel among the nodes 104a-c through which the nodes 104a-c can transmit messages back-and-forth. One example of software for implementing a messaging bus can be RabbitMQ™. The nodes 104a-c can transmit messages on the messaging bus 110 with the metadata 108a-c related to the respective actions. For example, the node 104c can transmit a message 118 on the messaging bus 110 with the metadata 108c relating to the listening service. The management software 106 can monitor the messaging bus 110 for such messages and retrieve the metadata 108a-c from the messages.

Having obtained the metadata 108a-c, the management software 106 can analyze the metadata 108a-c to derive relationships between the request 114 and the actions. The management software 106 can then store the relationships in the datastore 116. For example, the management software 106 can determine that all actions having corresponding metadata 108a-c that includes the unique identifier of the request 114 are associated with the request 114. The management software 106 can then store the relationship between these actions and the request 114 in the datastore 116. The management software 106 can also store other information about the request 114 and each corresponding action in the datastore 116.

Figure 2:
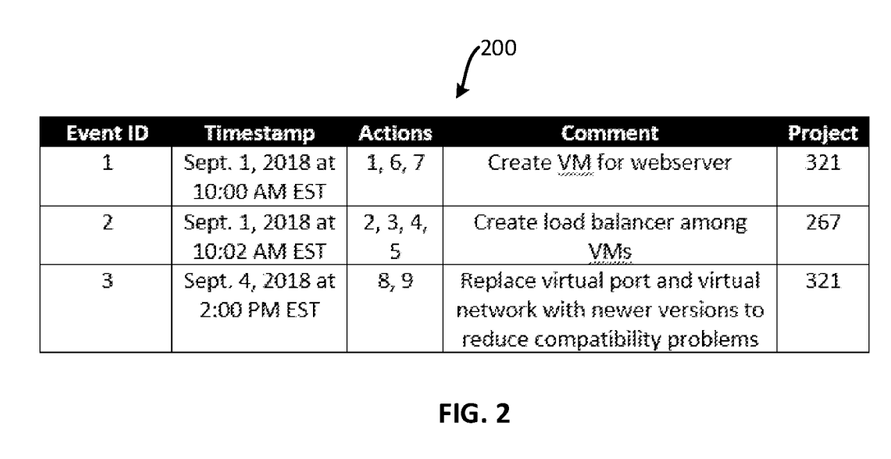
FIG. 2 is a table of an example of event data according to some aspects.
Figure 3:
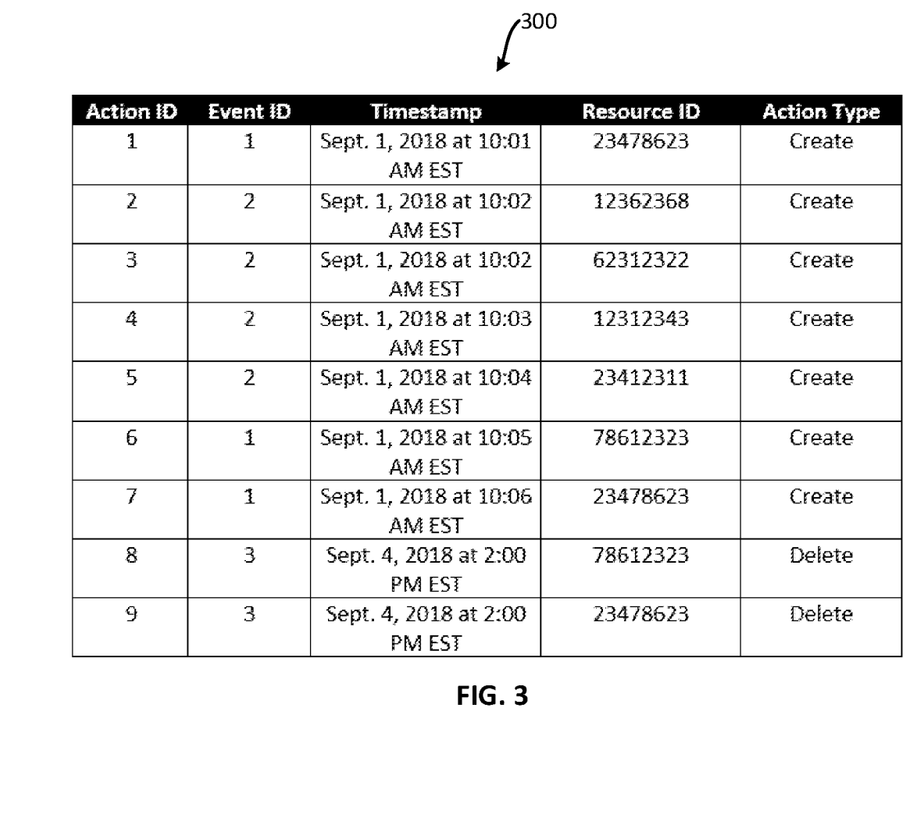
FIG. 3 is a table of an example of action data according to some aspects.

For example, the datastore 116 can include an events table with event data about various events occurring in the cloud computing environment 102. An example of an events table 200 is shown in FIG. 2. In one example, the events table 200 has a series of rows, whereby each row has information about a particular event. The information can include an event identifier that uniquely identifies the event, a timestamp at which the event occurred in the cloud computing environment 102, action identifiers that unique identify actions resulting from the event, a user-supplied comment about the event (e.g., which may describe a motivation for the event), a project identifier that unique identifies a project associated with the event, or any combination of these. The datastore 116 can also include an actions table with action data about various actions that occurred in the cloud computing environment 102. An example of an actions table 300 is shown in FIG. 3. In one example, the actions table 300 has a series of rows, whereby each row has information about a particular action. The information can include an action identifier that uniquely identifies the action, an event identifier that unique identifies the event that triggered the action, a timestamp at which the action occurred in the cloud computing environment 102, a resource identifier that uniquely identifies a virtualized computing resource on which the action was performed, an action type (e.g., create, delete, or modify) indicating what type of action was performed on the virtualized computing resource, or any combination of these. The management software 106 can store any amount and combination of the event data and the action data in any suitable configuration in any number and combination of datastores.

Referring to FIGS. 2-3 together, the events table 200 and the actions table 300 can indicate relationships between events and actions that occurred in the cloud computing environment. For example, Event #1 is shown in the events table 200. This event involves creating a virtual machine for a webserver, as expressed in the corresponding comment. As a result of Event #1, the actions 1, 6, and 7 were performed. These actions can include instantiating a virtual machine that has a Resource ID of 23478623, then subsequently creating a virtual port that has a Resource ID of 78612323, and then subsequently creating a virtual network connection that has a Resource ID of 23478623. Another example is Event #2 shown in events table 200. This event involves creating a virtual load balancer, as expressed in the corresponding comment. As a result of Event #2, the actions 2-5 were performed. These actions can include starting a pooling service that has a Resource ID of 12362368, starting a listening service that has a Resource ID of 62312322, and starting a health-monitoring service that has a Resource ID of 12312343, starting an inspection service that has a Resource ID of 23412311, or any combination of these. Yet another example is Event #3 shown in events table 200. This event involves replacing the virtual port and virtual network created in response to Event #1, as expressed in the corresponding comment. The user may wish to replace the virtual port and virtual network with newer versions to prevent compatability problems. As a result of Event #3, the actions 8 and 9 were performed. These actions can include deleting the virtual port (which has a Resource ID of 78612323) and the virtual network connection (which has a Resource ID of 23478623). Other actions may also result from this event, such as the generation of a new virtual port and a new virtual network connection, which are not shown in FIG. 3 for simplicity.

Referring back to FIG. 1, having derived and stored one or more relationships between the request event and the corresponding actions in the datastore 116, the management software 106 can then perform various tasks based on the relationships. These tasks can be configured to improve or optimize the performance of the cloud computing environment 102. For example, should an error occur in the cloud computing environment 102, a user can interact with the management software 106 to revert the cloud computing environment 102 back to an earlier state in which the error was not present.

As a particular example, the cloud computing environment 102 can generate the virtual load balancer in response to the request 114. But creating the virtual load balancer may result in a network error impacting how the cloud computing environment 102 is distributing certain types of incoming network-traffic among virtual machines. Given the interplay between the various services that form the virtual load balancer, it may be challenging to identify which of the services is causing the problem. So, the user can command the cloud computing environment 102 to revert back to a state prior to running the virtual load balancer. In response to the command, the management software 106 102 can access the event table 200 (e.g., in FIG. 2), determine that the event involving creating the virtual load balancer is Event #2, and then access the actions table 300 (e.g., in FIG. 3) to determine that actions 2-5 are related to Event #2. The management software 106 can then analyze the corresponding timestamps of actions 2-5 to determine that those actions occurred in a particular order—e.g., action 2, then action 3, then action 4, and finally action 5. The management software 106 can then undo each of these actions in a reverse order. For example, the management software 106 can first undo action 5, then action 4, then action 3, then action 2, and finally action 1. At the end of this process, the cloud computing environment 102 may be in a state that no longer results in the network error.

Figure 4:
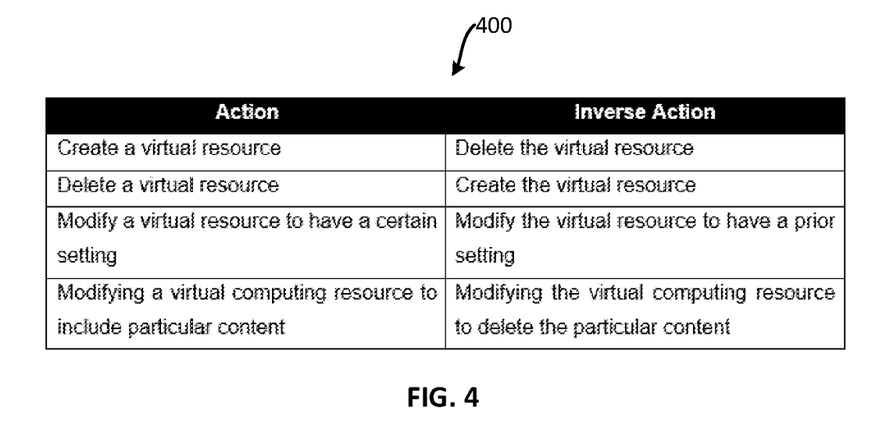
FIG. 4 is a table of an example of actions and inverse actions according to some aspects.

The management software 106 can use preprogrammed relationships between actions and inverses of those actions, which are referred to herein as "inverse actions," to determine how to undo a particular action. Some examples of actions and inverse actions are shown in table 400 of FIG. 4. The preprogrammed relationships can be stored as preprogrammed rules, stored in a database, or both. The management software 106 can use the preprogrammed relationships to determine which inverse action to use in order to undo a particular action. The management software 106 can then implement the inverse action.

While the example shown in FIG. 1 has a certain number and arrangement of components, these are merely illustrative. Other examples can include more components, fewer components, or a different arrangement of the components shown in FIG. 1. For instance, other examples can involve dozens or hundreds of client devices collectively generating (e.g., concurrently) hundreds or thousands of events in multiple cloud computing environments, some or all of which may be collectively monitored and managed by the management software 106.

Figure 5:
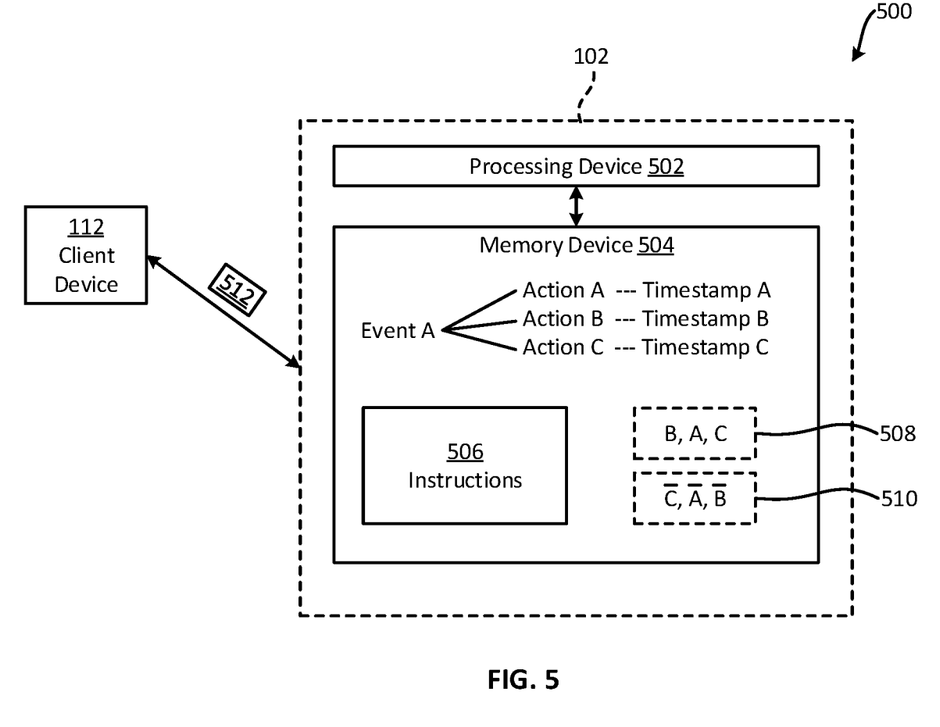
FIG. 5 is a block diagram of another example of a system for managing virtualized computing resources in a cloud computing environment according to some aspects.

FIG. 5 is a block diagram of another example of a system 500 for managing virtualized computing resources in a cloud computing environment 102 according to some aspects. The system 500 includes a processing device 502 communicatively coupled with a memory device 504. The processing device 502 can include one processing device or multiple processing devices. Non-limiting examples of the processing device 502 include a Field-Programmable Gate Array (FPGA), an application-specific integrated circuit (ASIC), a microprocessor, etc. The processing device 502 can execute instructions 506 stored in the memory device 504 to perform operations. In some examples, the instructions 506 can include processor-specific instructions generated by a compiler or an interpreter from code written in any suitable computer-programming language, such as C, C++, C#, etc.

The memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. In some examples, at least some of the memory device can include a medium from which the processing device 502 can read instructions 506. A computer-readable medium can include electronic, optical, magnetic, or other storage devices capable of providing the processing device 502 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 506.

In some examples, the processing device 502 can receive input 512 indicating that the cloud computing environment 102 is to be reverted back to a prior state prior to an event occurring. In response to the input 512, the processing device 502 can determine several actions that were performed in the cloud computing environment 102 in response to the event. For example, the processing device 502 can determine that actions A-C were performed in response to Event A (e.g., by accessing a datastore that has relationships between events and actions). Each action can involve a creation, modification, or deletion of a virtualized computing resource in the cloud computing environment 102. The processing device 502 can also determine a particular order in which the actions were performed by analyzing timestamps corresponding to the actions. For example, the processing device 502 can determine that actions A-C were performed in a particular order 508 by analyzing timestamps A-C corresponding to actions A-C. The processing device 502 can then revert the cloud computing environment 102 back to the prior state by performing an inverse of each action in the plurality of actions in a reverse order to the particular order. For example, the processing device 502 can perform inverses of actions A, B, and C, which are designated in FIG. 5 as $\overline{A}$, $\overline{B}$, and $\overline{C}$. The processing device 502 can perform these inverse actions in a reverse order 510 to the particular order 508.

In some examples, the processing device 502 can receive input indicating that the cloud computing environment 102 is to be reverted back to a prior state as of a prior point in time. To do so, the processing device 502 can determine that a particular event occurred subsequent to the prior point in time. For example, the processing device can analyze some or all of the events in an events table to determine that the particular event has a timestamp subsequent to the prior point in time. The processing device 502 can then determine which actions are related to the particular event. For example, the processing device 502 can filter the actions in an actions table to determine a group of actions related to the particular event. The processing device 502 can then determine a particular order in which the group of actions were performed by organizing the group of actions according to their corresponding timestamps. After determining the particular order in which the group of actions were performed, the processing device 502 can perform the inverse of each action in a reverse order to the particular order. The processing device 502 may iterate this process for each event having a timestamp that is subsequent to the prior point in time, in order to revert the cloud computing environment 102 back to the prior state.

In some examples, the processing device 502 can alert one or more users that a particular action on a virtual computing resource may negatively impact the functionality of one or more other virtual computing resources. For example, the processing device 502 can receive a command to modify or delete a first virtualized computing resource. The command may have been issued by the client device 112. In response to receiving the command, the processing device 502 can determine that a second virtualized computing resource depends on the first virtualized computing resource by identifying a dependency relationship among the first and second virtualized computing resources (e.g., in datastore 116 of FIG. 1). In response to determining that the second virtualized computing resource depends on the first virtualized computing resource, the processing device 502 can transmit a notification to the client device 112. The notification can indicate that modifying or deleting the first virtualized computing resource could negatively impact the functionality of the second virtualized computing resource. The notification can be a visual notification, and auditory notification, a haptic notification, or any combination of these. A user of the client device 112 may receive the notification and take some alternative action based on the notification.

Figure 6:
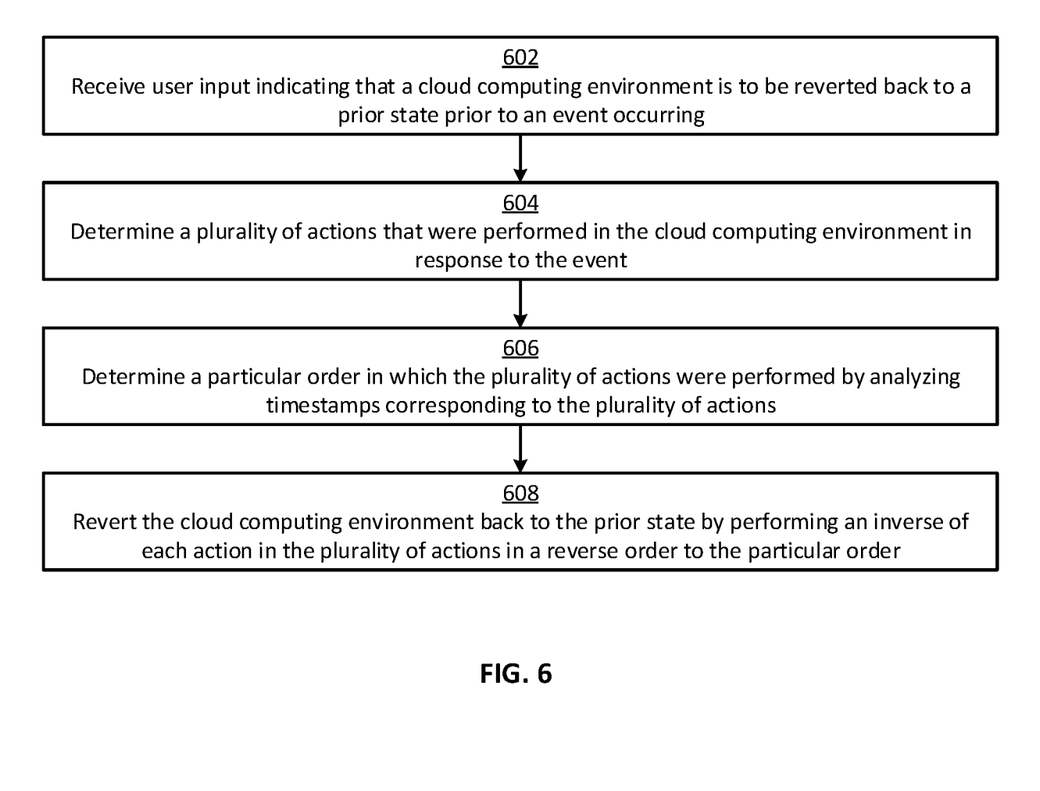
FIG. 6 is a flow chart of an example of a process for managing virtualized computing resources in a cloud computing environment according to some aspects.

In some examples, the processing device 502 can implement some or all of the steps shown in FIG. 6. Other examples can include more steps, fewer steps, different steps, or a different combination of steps than are shown in FIG. 6. The steps of FIG. 6 are discussed below with reference to the components discussed above in relation to FIG. 5.

In block 602, a processing device 502 receives input 512 indicating that a cloud computing environment 102 is to be reverted back to a prior state prior to an event occurring. The input can be user input provided via a user input device, such as a mouse, keyboard, or touchpad. Alternatively, the input can be a command or signal transmitted to the processing device 502 from another computing device, such as client device 112.

In block 604, the processing device 502 determines a group of actions that were performed in the cloud computing environment 102 in response to the event. For example, the processing device 502 can determine that the Actions A-C shown in FIG. 5 were performed in response to Event A by accessing one or more data-structures with relationships between Event A and Actions A-C.

In block 606, the processing device 502 determines a particular order in which the actions were performed by analyzing timestamps corresponding to the actions. For example, the processing device 502 can determine that Actions A-C were performed in a particular order 508 by analyzing timestamps A-C from oldest time-stamp to most recent time-stamp.

In block 608, the processing device 502 reverts the cloud computing environment 102 back to the prior state by performing an inverse of each action in the plurality of actions in a reverse order to the particular order. For example, the processing device 502 can identify inverse actions $\overline{A}$, $\overline{B}$, and $\overline{C}$ to the actions A, B, and C using preprogramming relationships between actions and inverse actions. The processing device 502 can then execute the inverse actions in a reverse order 510 to the particular order 508 (e.g., first $\overline{C}$, then $\overline{A}$, and finally $\overline{B}$).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
   a processing device; and
   a memory device including instructions that are executable by the processing device for causing the processing device to:
   detect an event in a cloud computing environment;
   cause a plurality of actions to be performed in the cloud computing environment in response to detecting the event, at least one action in the plurality of actions being dependent on another action in the plurality of actions, wherein each action in the plurality of actions involves a creation, a modification, or a deletion of a respective virtualized computing resource in the cloud computing environment; and subsequent to causing the plurality of actions to be performed:
receive input indicating that the cloud computing environment is to be reverted back to a prior state prior to the event occurring;
determine the plurality of actions that were performed in the cloud computing environment in response to the event;
determine a particular order in which the plurality of actions were performed relative to one another by analyzing timestamps corresponding to the plurality of actions; and
revert the cloud computing environment back to the prior state by causing an inverse of each action in the plurality of actions to be performed in a reverse order to the particular order.

2. The system of claim 1, wherein the memory device further includes instructions that are executable by the processing device for causing the processing device to determine the plurality of actions that were performed in the cloud computing environment in response to the event by, for each action in the plurality of actions:
identifying metadata corresponding to the action; and
determining that the metadata includes an identifier associated with the event.

3. The system of claim 2, wherein the memory device further includes instructions that are executable by the processing device for causing the processing device to determine the plurality of actions that were performed in the cloud computing environment in response to the event by, for each action in the plurality of actions:
monitoring a messaging bus between nodes in the cloud computing environment for a message corresponding to the action, wherein the message includes the metadata; and
extracting the metadata from the message.

4. The system of claim 2, wherein the memory device further includes instructions that are executable by the processing device for causing the processing device to determine the particular order in which the plurality of actions were performed by, for each action in the plurality of actions:
retrieving a timestamp corresponding to the action from the metadata; and
positioning the action within the particular order based on the timestamp being greater than or less than another timestamp corresponding to another action in the plurality of actions.

5. The system of claim 1, wherein the memory device further includes instructions that are executable by the processing device for causing the processing device to:
store a plurality of datasets corresponding to the plurality of actions in a data-structure, each dataset among the plurality of datasets corresponding to an action among the plurality of actions and including (i) an event identifier associated with the event, (ii) a timestamp corresponding to the action, and (iii) a reference to a particular virtualized computing resource related to the action.

6. The system of claim 5, wherein the prior state is a state of the cloud computing environment as of a prior point in time, and wherein the memory device further includes instructions that are executable by the processing device for causing the processing device to revert the cloud computing environment back to the prior state by:
determining that the event occurred subsequent to the prior point in time based on an event timestamp corresponding to the event expressing a time that is subsequent to the prior point in time; and
in response to determining that the event occurred subsequent to the prior point in time:
filtering the data-structure for the event identifier to determine the plurality of actions related to the event;
determining the particular order in which the plurality of actions were performed by organizing the plurality of actions by corresponding timestamps;
determining the inverse of each action in the plurality of actions; and
performing the inverse of each action in the plurality of actions in the reverse order.

7. The system of claim 1, wherein the memory device further includes instructions that are executable by the processing device for causing the processing device to perform the plurality of actions by sequentially generating a plurality of virtualized computing resources that depend on one another for functionality within the cloud computing environment.

8. The system of claim 7, wherein the memory device further includes instructions that are executable by the processing device for causing the processing device to:
receive a command to modify or delete a first virtualized computing resource among the plurality of virtualized computing resources;
in response to receiving the command, determine that a second virtualized computing resource among the plurality of virtualized computing resources depends on the first virtualized computing resource for functionality by analyzing dependency relationships among the plurality of virtualized computing resources in a database; and
in response to determining that the second virtualized computing resource depends on the first virtualized computing resource, generate a notification indicating that modifying or deleting the first virtualized computing resource could negatively impact the functionality of the second virtualized computing resource.

9. The system of claim 1, wherein the event includes a request from a client device that is external to the cloud computing environment to create a virtual machine or a virtualized load balancer in the cloud computing environment.

10. A method comprising:
receiving, by a processing device, input indicating that a cloud computing environment is to be reverted back to a prior state prior to an event occurring;
determining, by the processing device, a plurality of actions that were triggered by the event and that were performed in the cloud computing environment prior to receiving the input, each action among the plurality of actions involving a creation, a modification, or a deletion of a virtualized computing resource in the cloud computing environment;
determining, by the processing device, a particular order in which the plurality of actions were performed as a result of the event by analyzing timestamps corresponding to the plurality of actions; and
reverting, by the processing device, the cloud computing environment back to the prior state by causing an inverse of each action in the plurality of actions to be performed in a reverse order to the particular order.

11. The method of claim 10, further comprising determining the plurality of actions that were performed in the cloud computing environment in response to the event by, for each action in the plurality of actions:
identifying metadata corresponding to the action; and
determining that the metadata includes an identifier associated with the event.

12. The method of claim 11, further comprising determining the plurality of actions that were performed in the cloud computing environment in response to the event by, for each action in the plurality of actions:
monitoring a messaging bus between nodes in the cloud computing environment for a message corresponding to the action, wherein the message includes the metadata; and
extracting the metadata from the message.

13. The method of claim 10, further comprising determining the particular order in which the plurality of actions were performed by, for each action in the plurality of actions:
retrieving a timestamp corresponding to the action from metadata corresponding to the action; and
positioning the action within the particular order based on the timestamp being greater than or less than another timestamp corresponding to another action in the plurality of actions.

14. The method of claim 10, further comprising
storing a plurality of datasets corresponding to the plurality of actions in a second data-structure, each dataset among the plurality of datasets corresponding to an action among the plurality of actions and including (i) an event identifier associated with the event and (ii) a timestamp corresponding to the action.

15. The method of claim 10, wherein the prior state is a state of the cloud computing environment as of a prior point in time, and further comprising reverting the cloud computing environment back to the prior state by:
determining that the event occurred subsequent to the prior point in time by analyzing information about the event in a first data-structure to determine that an event timestamp corresponding to the event expresses a time that is subsequent to the prior point in time; and
in response to determining that the event occurred subsequent to the prior point in time:
filtering a second data-structure for an event identifier associated with the event to determine the plurality of actions related to the event;
determining the particular order in which the plurality of actions were performed by organizing the plurality of actions by corresponding timestamps;
determining the inverse of each action in the plurality of actions; and
performing the inverse of each action in the plurality of actions in the reverse order.

16. The method of claim 10, further comprising
receiving a command to modify or delete a first virtualized computing resource, the first virtualized computing resource being among a plurality of virtualized computing resources generated based on the plurality of actions;
in response to receiving the command, determining that a second virtualized computing resource among the plurality of virtualized computing resources depends on the first virtualized computing resource for functionality by analyzing dependency relationships among the plurality of virtualized computing resources in a database; and
in response to determining that the second virtualized computing resource depends on the first virtualized computing resource, generating a notification indicating that modifying or deleting the first virtualized computing resource could negatively impact the functionality of the second virtualized computing resource.

17. A non-transitory computer-readable medium comprising program code that is executable by a processing device for causing the processing device to:
receive input indicating that a cloud computing environment is to be reverted back to a prior state prior to an event occurring;
determine a plurality of actions that were performed in the cloud computing environment in response to the event, each action among the plurality of actions involving a creation, a modification, or a deletion of a virtualized computing resource in the cloud computing environment;
determine a particular order in which the plurality of actions were performed by analyzing timestamps corresponding to the plurality of actions; and
revert the cloud computing environment back to the prior state by causing an inverse of each action in the plurality of actions to be performed in a reverse order to the particular order.

18. The non-transitory computer-readable medium of claim 17, further comprising program code that is executable by the processing device for causing the processing device to determine the plurality of actions that were performed in the cloud computing environment in response to the event by, for each action in the plurality of actions:
identifying metadata corresponding to the action; and
determining that the metadata includes an identifier associated with the event.

19. The non-transitory computer-readable medium of claim 18, further comprising program code that is executable by the processing device for causing the processing device to determine the plurality of actions that were performed in the cloud computing environment in response to the event by, for each action in the plurality of actions:
monitoring a messaging bus between nodes in the cloud computing environment for a message corresponding to the action, wherein the message includes the metadata; and
extracting the metadata from the message.

20. The non-transitory computer-readable medium of claim 17, further comprising program code that is executable by the processing device for causing the processing device to determine the particular order in which the plurality of actions were performed by, for each action in the plurality of actions:
retrieving a timestamp corresponding to the action from metadata corresponding to the action; and
positioning the action within the particular order based on the timestamp being greater than or less than another timestamp corresponding to another action in the plurality of actions.

* * * * *